(12) United States Patent
Abdillah et al.

(10) Patent No.: US 8,390,504 B2
(45) Date of Patent: Mar. 5, 2013

(54) IDENTIFICATION OF POTENTIAL THREAT MATERIALS USING ACTIVE ELECTROMAGNETIC WAVES

(75) Inventors: Mohammed Ben Abdillah, Cork (IE); Brendan Lyons, Owens (IE); Emil Entchev, Ballincollig (IE)

(73) Assignee: Smiths Detection Ireland Limited, Ballincollig (IE)

( * ) Notice: Subject to any disclaimer, the term of this patent is extended or adjusted under 35 U.S.C. 154(b) by 161 days.

(21) Appl. No.: 13/000,876

(22) PCT Filed: Jul. 1, 2009

(86) PCT No.: PCT/IE2009/000043
§ 371 (c)(1),
(2), (4) Date: Dec. 22, 2010

(87) PCT Pub. No.: WO2010/001377
PCT Pub. Date: Jan. 7, 2010

(65) Prior Publication Data
US 2011/0102235 A1 May 5, 2011

(30) Foreign Application Priority Data
Jul. 1, 2008 (IE) .................................... 2008/0540

(51) Int. Cl.
*G01S 13/00* (2006.01)
(52) U.S. Cl. ........................................................ 342/22
(58) Field of Classification Search .................. 342/22
See application file for complete search history.

(56) References Cited

U.S. PATENT DOCUMENTS

| 5,177,445 | A | * | 1/1993 | Cross ............................. 324/637 |
| 5,227,800 | A | * | 7/1993 | Huguenin et al. ............ 342/179 |
| 5,363,050 | A | * | 11/1994 | Guo et al. ...................... 324/638 |
| 5,365,237 | A | * | 11/1994 | Johnson et al. ............... 342/179 |
| 5,592,170 | A | * | 1/1997 | Price et al. ...................... 342/22 |
| 5,807,257 | A | * | 9/1998 | Bridges ......................... 600/430 |
| 6,057,761 | A | * | 5/2000 | Yukl ........................... 340/568.1 |
| 6,242,740 | B1 | * | 6/2001 | Luukanen et al. ............. 250/353 |
| 6,353,224 | B1 | * | 3/2002 | Sinclair et al. ............. 250/336.1 |
| 6,480,141 | B1 | * | 11/2002 | Toth et al. ........................ 342/22 |
| 6,501,414 | B2 | * | 12/2002 | Arndt et al. ..................... 342/22 |

(Continued)

FOREIGN PATENT DOCUMENTS
WO    WO2006/067773    6/2006

*Primary Examiner* — Jack W Keith
*Assistant Examiner* — Peter Bythrow
(74) *Attorney, Agent, or Firm* — Casimir Jones, S.C.

(57) ABSTRACT

Electrical properties of concealed dielectric objects, such as the dielectric permittivity, can be deduced from incident, reflected, and transmitted electromagnetic waves in an imaging system. In a confocal arrangement a horn illuminates a reflect array and the reflect array is configured to focus the radiation at an element in the scan volume. The reflections are in turn refocused by a reflect array at the horn aperture. The reflect array is electronically configured to scan the focal point throughout the scan volume in a systematic way. Knowledge of the horn pattern and the scan strategy allows the system to compute the geometry associated with each volume element. Amplitude and phase variations between the object and the surrounding volume and the computed geometry are used to estimate the relative permittivity and thus facilitate categorization of the object using a database of material relative permittivities.

14 Claims, 3 Drawing Sheets

Imaging of subject with object on the body.

U.S. PATENT DOCUMENTS

| | | | |
|---|---|---|---|
| 6,777,684 B1* | 8/2004 | Volkov et al. | 250/341.1 |
| 6,791,487 B1* | 9/2004 | Singh et al. | 342/22 |
| 6,861,972 B2* | 3/2005 | Britton et al. | 342/70 |
| 6,937,182 B2* | 8/2005 | Lovberg et al. | 342/22 |
| 7,298,318 B2* | 11/2007 | Baharav et al. | 342/179 |
| 7,504,993 B2* | 3/2009 | Young et al. | 342/179 |
| 7,763,868 B2* | 7/2010 | Ouchi et al. | 250/493.1 |
| 2003/0163042 A1* | 8/2003 | Salmon | 600/436 |
| 2004/0056790 A1* | 3/2004 | Lovberg et al. | 342/22 |
| 2004/0080448 A1* | 4/2004 | Lovberg et al. | 342/22 |
| 2004/0140924 A1* | 7/2004 | Keller et al. | 342/22 |
| 2005/0024257 A1* | 2/2005 | Britton et al. | 342/70 |
| 2006/0279450 A1* | 12/2006 | Annan et al. | 342/22 |
| 2007/0102629 A1* | 5/2007 | Richard et al. | 250/225 |
| 2007/0139248 A1* | 6/2007 | Baharav et al. | 342/22 |
| 2007/0139249 A1* | 6/2007 | Baharav et al. | 342/22 |
| 2008/0079625 A1* | 4/2008 | Weems et al. | 342/22 |
| 2010/0069744 A1* | 3/2010 | Simpkin | 600/425 |

* cited by examiner

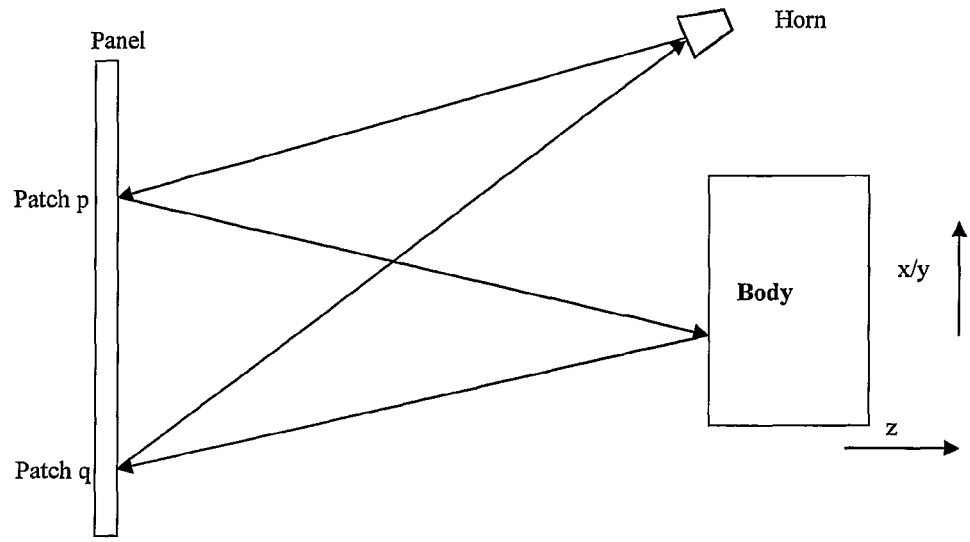
Fig. 3 Imaging of body only.
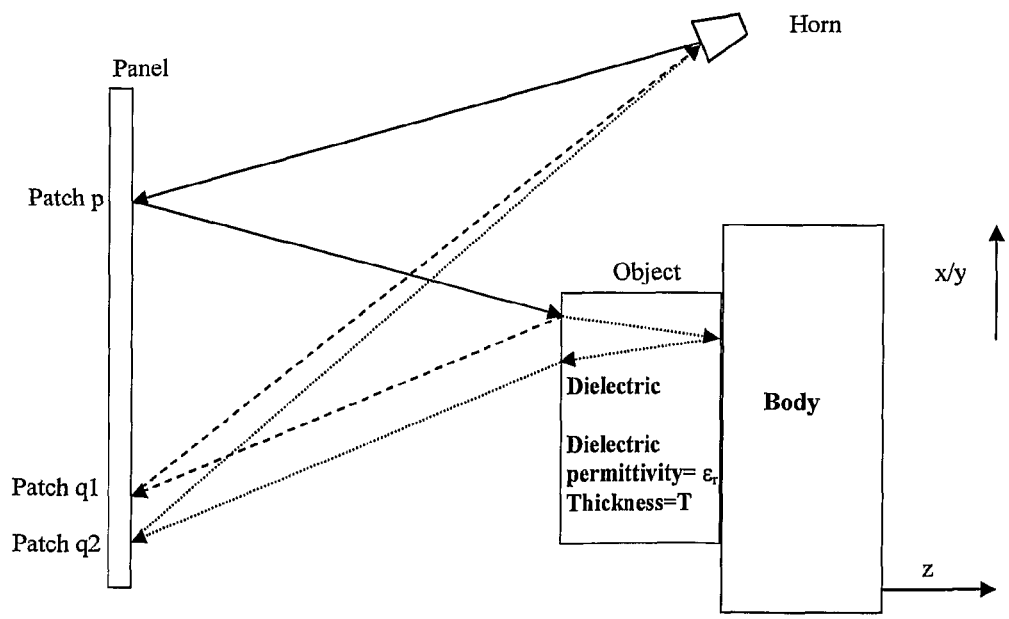
Fig. 4 Imaging of subject with object on the body.

IDENTIFICATION OF POTENTIAL THREAT MATERIALS USING ACTIVE ELECTROMAGNETIC WAVES

This application is a §371 US National Entry of International Application No. PCT/IE2009/000043, filed Jul. 1, 2009, which claims the benefit of Irish Application No. 2008/0540, filed Jul. 1, 2008, each of which is incorporated herein by reference in its entirety.

FIELD

The invention relates to imaging systems for identification of concealed items, for example imaging systems for security scanning. It applies to imaging systems which operate over any of a wide range of frequencies.

BACKGROUND

In response to security threats in transportation and public spaces, inspection of people for materials such as narcotics and explosives and other types of contraband is becoming common at security checkpoints at, for example, airports, train stations, sporting events, concerts, federal buildings, and other public and private facilities. Systems using non-ionizing radiation, such as terahertz and millimeter range radiation, for imaging of concealed items of interest are known. Such systems are described in, for example, WO200875948, U.S. Pat. No. 7,304,306, and U.S. Pat. No. 7,295,019.

WO200875948 describes analysis of imaging radiation to visualize properties of the human internal body, such as electrical conductivity, electric permittivity, and magnetic permeability. Non-coherent waves having a large bandwidth are transmitted, to ensure that they are harmless. The bandwidth is preferably half of a control frequency. The radiation source may for example be a broadband non-coherent noise generator.

U.S. Pat. No. 7,304,306 describes an imaging system using terahertz radiation, and a direct conversion detector module is used. Detected radiation is split into several components, which are attenuated. The objective is to detect explosive material. The different signals are combined to provide a composite signal.

U.S. Pat. No. 7,295,019 describes use of capacitive and inductance sensors for detecting concealed items such as plastic explosives and ceramic knives.

The invention is directed towards providing for improved detection of non-metallic concealed items, particularly with improved differentiation between threat and non-threat items.

SUMMARY

An imaging system comprises:
a transmitter for directing radiation at a volume in which there is a target;
a receiver for receiving scattered radiation from the target; and
a processor for processing the scattered radiation to generate an image according to amplitude and phase of the received radiation.

It may further comprise a display coupled to the processor, for generating an image display.

The processor is in one embodiment adapted to classify a concealed dielectric material according to permittivity relative to that of the human body, said relative permittivity being deduced from amplitude and phase information in the received radiation.

In one embodiment, the transmitter is adapted to transmit the incident radiation with a substantially single frequency.

In one embodiment, said frequency is in the range of 1 GHz to 300 GHz.

In one embodiment, said frequency is in the range of 1 GHz to 80 GHz.

In another embodiment, the processor is adapted to automatically identify anomalies at edges in the recorded images, and to use said anomalies when deriving relative permittivity data.

In one embodiment, the processor is adapted to classify materials based on a database of relative permittivities, and said database includes permittivity data or relative permittivity data for specified threat materials such as explosives or narcotics.

In a further embodiment, the processor measures phase and amplitude of scattered radiation both near the concealed material and at the concealed material, that near the concealed material providing a reference.

In one embodiment, the system is adapted to detect radiation from two or more volume elements, a volume element providing reference data if it does not include the concealed material.

In another embodiment, the processor is adapted to process amplitude and phase contrast from element to element in the scan volume to generate an image of the scan volume.

In one embodiment, different amplitude and phase responses for the elements are used by the processor to detect the location and the orientation of a concealed material.

In one embodiment, the transmitter and the receiver comprise a horn in a confocal arrangement, in which the horn illuminates a reflect array and the reflect array is configured to focus the radiation at an element in the scan volume, and the reflections are in turn refocused by the reflect array at the horn aperture, and the processor is adapted to control the reflect array to scan the focal point throughout the scan volume in a systematic way, and to use horn pattern and the scan strategy to compute the geometry associated with each volume element in terms of individual rays, and in which amplitude and phase variations between the object and the surrounding volume and the computed geometry are used to estimate the relative permittivity.

In one embodiment, for each transmitted ray data for two returned rays is processed by the processor, in which a first ray is reflected off the surface of the object and a second ray is transmitted through the object and reflected at an interface between the object and the body, and in which the processor is adapted to perform an estimation process which tracks both rays and identifies the following events:
neither ray is recovered by the horn and therefore plays no part in the estimation process,
the first ray is recovered and is accounted for in the estimation process but the second ray is lost,
the second ray is recovered and is accounted for in the estimation process but the first ray is lost, and
both rays are recovered and both contribute to the estimation process.

In one embodiment, the processor is adapted to execute algorithms implementing Snell's law coupled to the electromagnetic properties of fields in the vicinity of boundaries to compute amplitude as a level of attenuation, and phase, $\tau_{model}$ and $\Phi_{model}$, of received radiation.

In one embodiment, the processor is adapted to execute algorithms reflecting the electromagnetic properties of wave impedance and reflection coefficient in the vicinity of boundaries to compute amplitude as a level of attenuation, and phase, $\tau_{model}$ and $\Phi_{model}$, of received radiation.

In one embodiment, the processor is adapted to execute confocal image theory algorithms to compute amplitude as a level of attenuation and phase, $\tau_{model}$ and $\Phi_{model}$, of received radiation.

In one embodiment, the system further comprises a reflector for reflecting scattered radiation, and the receiver is mounted to receive radiation after being reflected.

In one embodiment, the reflector comprises a reflect array configured to focus the transmitted radiation at successive elements in the scan volume.

In one embodiment, the transmitter and the receiver comprise a horn antenna, and the system comprises a reflect array arranged in tiles, each tile consisting of an array of patch antennas with switching transistors and an associated controller for controlling the transistors, and in which the controller is adapted to configure phases of the patch antennas to achieve a particular pattern in space when the array is illuminated by the horn antenna, in which the processor is adapted to:

calculate and sum distance from the horn antenna to a patch and distance from the patch to the focal point, convert said distance into wavelengths at the operating frequency, and convert a fractional portion of the distance into phase by multiplying by a number of degrees, and in which for each patch to constructively contribute to the focus the phases must be substantially identical.

In one embodiment, a transistor is selected to add 0 or 180 degree phase shift depending on the calculated phase by turning it on and 0 degrees by turning it off, scanning being implemented over the volume by applying appropriate patterns of switching the transistors.

DETAILED DESCRIPTION

Brief Description of the Drawings

The invention will be more clearly understood from the following description of some embodiments thereof, given by way of example only with reference to the accompanying drawings in which:—

FIG. 3 is a diagram illustrating incident and scattered radiation where there is no potential threat object present; and FIG. 4 shows the radiation where there is a potential threat.

DESCRIPTION OF THE EMBODIMENTS

The invention involves using different views taken using active microwave imaging hardware, and automatically classifying a material carried on the human body as safe or as a potential threat material. The automatic classification is based on the fact that the human body has a much higher reflectivity (as its permittivity is much higher) than many dielectric materials such as explosives or narcotic potential threat materials.

In this specification, unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

A microwave imaging system enables the detection of concealed threats on the human body, due to penetration of microwaves through materials. The term microwave in this context refers to electromagnetic radiation in the frequency range of 1 to 300 GHz.

An imaging system can use any non-ionizing radiation, including but not limited to millimeter wave or terahertz radiation. In one embodiment the system uses millimeter wave illumination to image an object. The incident beam can be focused using a reflect array. For imaging, the reflect array can be arranged in tiles. Each tile can consist of an array of patch antennas with switching FETs and the associated electronics for controlling the FETs. Each panel constitutes a reflect array. The phases of the individual patches can be configured to achieve a particular pattern in space when the array is illuminated by a horn antenna. The distance from the horn to a patch and the distance from the patch to the focal point can be calculated and summed. The resulting distance can then be converted into wavelengths at the operating frequency. The fractional portion of the distance can be converted into phase by multiplying by 360 degrees. For each patch to constructively contribute to the focus, the phases resulting from the above calculation should be identical or substantially identical. It is possible to approximate this by having the phases agree by better than 180 degrees. To achieve this, the FETs can be selected to add 0 or 180 degree phase shift depending on the calculated phase. A FET can be configured to deliver a phase shift of 180 degrees by turning it on and 0 degrees by turning it off. Thus, scanning can be implemented over a volume by applying appropriate patterns of ones and zeroes to the FETs.

Figure 1:
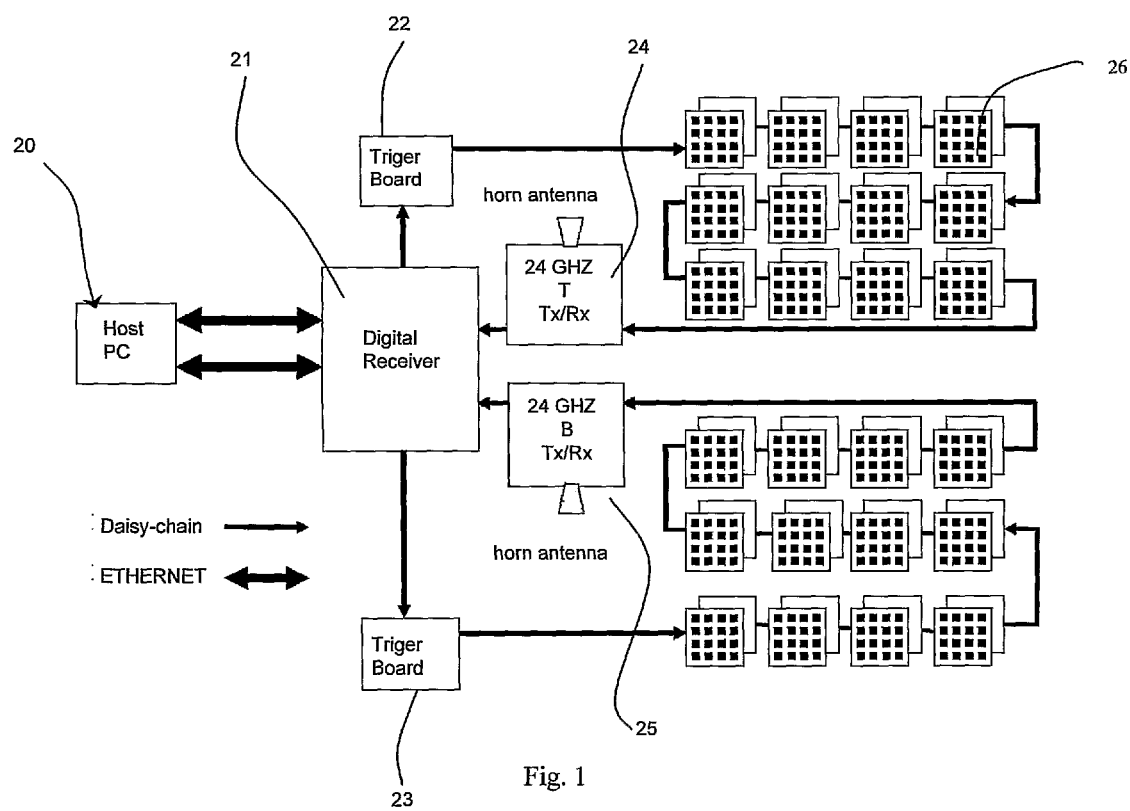
FIGS. 1 and 2 are diagrams illustrating hardware of a system of the invention.
Figure 2:
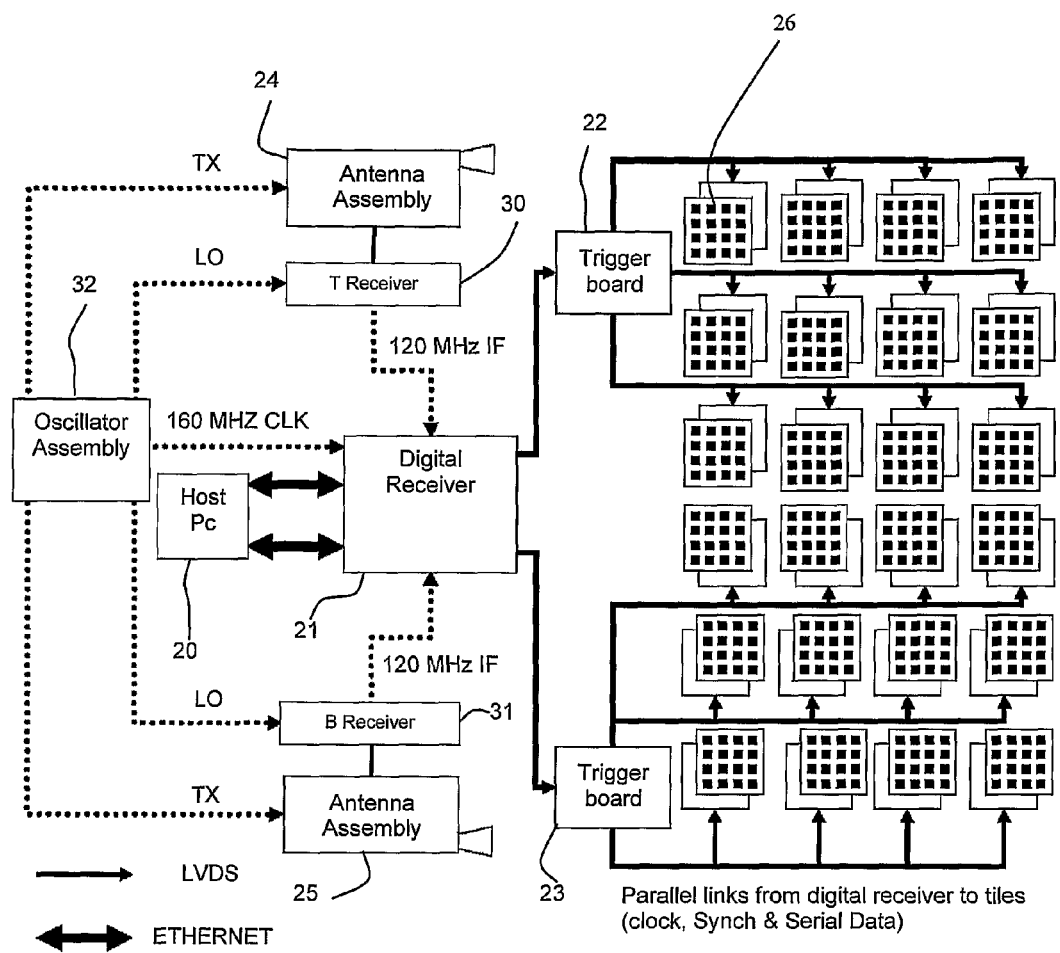

Referring to FIGS. 1 and 2, the imaging system is in one embodiment a real-time imaging system having a controller 20 which is responsible for all decision-making. The controller 20 controls display of the images and a graphical user interface. A digital receiver 21 can control the panels through trigger boards 22 and 23. Received radiation responses are via horn antenna circuits 24 and 25. The PC 20 connects to the digital receiver 21 using two Ethernet links. All PC instructions can be sent via the digital receiver 21 and all responses from the system are returned to the PC 20 via the digital receiver 21. The daisy-chain interconnection from the digital receiver 21 to the tiles 26 allows communication of general instructions and data, such as write instructions, uploading reflector switch patterns and diagnostics. In general, the daisy-chain links can be used for bi-directional communication. FIG. 2 shows trigger boards 22 and 23 and parallel links between them and each tile. These parallel links provide scan block addresses and synchronisation signals. Power is also supplied to the tiles 26 via the trigger boards 22 and 23.

The radiation frequency used in one embodiment is 24.12 GHz. It has been found that a frequency range of 1 GHz to 80 GHz is particularly effective in some embodiments, and that a sub-range of 1 GHz to 40 GHz is particularly effective. However, it is envisaged that different wavelengths may be employed in other embodiments, up to 300 GHz.

In order for a threat to be detectable with microwaves, it needs to have properties that, in terms of electromagnetic wave propagation, are different compared to the surrounding material (human body).

An active microwave imaging system illuminates a predefined scan volume, and measures both the amplitude and phase of the received signal from each volume element in the scan volume. The amplitude and phase contrast from element to element is used to generate an image of the scan volume.

The amplitude and phase of the received signal are functions of the geometry of the imaging rays, the geometry of the object, and the dielectric properties of the object. Analysis of amplitude and phase data allows computation of these object properties.

Computing Electrical Properties of Objects

Electrical properties of the objects, such as the dielectric permittivity, can be deduced from incident, reflected, and transmitted electromagnetic waves. The reflection and transmission of electromagnetic waves or rays are functions of the geometry, the surface texture and the wave impedance on both sides of the object interface. The wave impedance is dependent on the permeability and permittivity of the material. For most materials of concern permeability is not a differentiator and therefore can be ignored. The dielectric properties are related to the intrinsic material properties and state of the object. The dielectric permittivity $\in$ is complex ($\in=\in'-j\in''$), $\in'$ and $\in''$ are respectively related to energy storage and energy dissipation in the material. The permittivity can be used to classify the material.

The scan geometry is based on a confocal system where a horn illuminates a reflect array and the reflect array is configured to focus the radiation at an element in the scan volume. The reflections are in turn refocused by a reflect array at the horn aperture. The reflect array is electronically configured to scan the focal point throughout the scan volume in a systematic way. Knowledge of the horn pattern and the scan strategy allows the system to compute the geometry associated with each volume element. This is often referred to as "ray tracing". Amplitude and phase variations between the object and the surrounding volume and the computed geometry are used to estimate the relative permittivity and thus facilitate categorization of the object using a database of material relative permittivities.

FIGS. 3 and 4 illustrate the geometry used in the estimation process. FIG. 3 is a case where the body is imaged and FIG. 4 is a case where a concealed object located on the body is detected and the relative permittivity of the object is estimated. All rays originating at the horn and terminating at the horn are used in the estimation process.

The estimate of relative permittivity is based on the change in attenuation and phase delay between the situations in FIGS. 3 and 4. The attenuation and phase delay are extracted from image data. These are then written in terms of the unknowns—relative permittivity, and object thickness. The resulting equations are solved to arrive at an estimate of relative permittivity and object thickness.

For each transmitted ray two returned rays must be considered, as illustrated in FIG. 4. Ray 1 (detected as q1) is reflected off the surface of the object and ray 2 (detected as q2) is transmitted through the object and reflected at the interface between the object and the body. Internal reflection from the object surface is discounted. The imaging system performs an estimation process which tracks both rays and accounts for four eventualities:

1) Neither ray is recovered by the horn and therefore plays no part in the estimation process.
2) Ray 1 is recovered and is accounted for in the estimation process but Ray 2 is lost.
3) Ray 2 is recovered and is accounted for in the estimation process but Ray 1 is lost.
4) Both rays are recovered and both contribute to the estimation process.

As described above, each incident ray generates an associated Ray 1 and Ray 2. The estimation process implemented by the imaging system accounts for all incident rays originating at the horn.

Object detection software processes the image to identify objects on the body and the material classification software automatically reports an estimate of relative permittivity and its classification. The detection software uses edges in the images to identify anomalies.

The material categorisation process can also be user-driven, an operator selecting a concealed object in the image and then selecting a nearby part of the body to use as a reference for the measurement.

Computing Electrical Properties of Objects: Details of Estimation Process

A ray Ep, with amplitude unity is emitted from the horn towards the patch p.

In the case of FIG. 1, the ray, after reflection from the object is directed to patch q whose position is known using geometrical optics. The ray reflected from patch q is directed towards the horn. The received ray with complex amplitude Rp is given by Rp=Ep·Gp·ρq·Gq·exp(iϕq) where Gp and Gq are the horn gains at the patches p and q. ρq is the reflection coefficient related to reflection from the body and ϕq is the total electrical path length.

In the case of FIG. 4, the ray, after being reflected by both the object and the body generates two rays, one is directed towards patch q1 and the other towards patch q2. The positions of patches q1 and q2 are known using geometrical optics. The reflected rays from patches q1 and q2 are directed towards the horn, therefore, the received composite ray with complex amplitude Rp is given by Rp=Ep·Gp·(ρq1·Gq1·exp(iϕq1)+ρq2·Gq2·exp(iϕq2)) where Gp, Gq1 and Gq2 are the horn gains at the patches p, q1 and q2. ρq1 and ρq2 are the reflection coefficients related to the object and body respectively. ϕq1 and ϕq2 are the respective electrical path lengths.

The signal received in FIG. 4 is attenuated and phase shifted with respect to the signal received in FIG. 3.

$$\frac{Rp(\text{FIG. 2})}{Rp(\text{FIG. 1})} = \frac{Gq1.\rho q1.\exp(i\varphi q1) + Gq2.\rho q2.\exp(i\varphi q2)}{Gq.\rho q.\exp(i\varphi q)} = \rho_p \cdot \exp(i \cdot \varphi_p)$$

$\rho_p$ is the attenuation relative to the ray emitted to patch p.
$\phi_p$ is the phase shift relative to the ray emitted to patch p.

All rays originating at the horn (a ray per patch) are used in the estimation of the attenuation ($\tau$) and the phase shift ($\Phi$) between the received signals in FIGS. 3 and 4.

$$\tau_{model} = \text{abs}\left(\frac{\sum_{}^{number\_of\_Patches} \rho_p \cdot \exp(i \cdot \varphi_p)}{number\_of\_Patches}\right) \quad \text{Equation 1}$$

$$\Phi_{model} = \text{angle}\left(\frac{\sum_{}^{number\_of\_Patches} \rho_p \cdot \exp(i \cdot \varphi_p)}{number\_of\_Patches}\right) \quad \text{Equation 2}$$

$\tau_{model}$ and $\Phi_{model}$ are written in terms of the unknowns—relative permittivity $\in_r$, and object thickness T.

The relative permittivity $\in_r$, and object thickness T are chosen to ensure a best fit of computed $\tau_{model}$ and $\Phi_{model}$ to measured $\tau$ and $\Phi$.

There are several methods available to perform the calculation of $\tau_{model}$ and $\Phi_{model}$.

Method 1: Using Ray Tracing Formulas

Snell's law coupled to the electromagnetic properties of fields in the vicinity of boundaries are used to compute $\tau_{model}$ and $\Phi_{model}$.

Method 2: Using the Wave Impedance

In order to compute $\tau_{model}$ and $\Phi_{model}$, the calculation depicts the changing wave impedance and reflection coefficient when a wave flows from the horn to the target and back to the horn. It also uses the electromagnetic properties of wave impedance and reflection coefficient in the vicinity of boundaries.

Method 3: Based on the Theory of Confocal Imaging

The transmitted beam is first computed, this then illuminates the body and threat resulting in a reflected beam. The reflected beam is in turn reflected from the panel to the horn. The signal received by the horn is used to compute the attenuation and phase shift between the transmitted and reflected signals, respectively $\tau_{model}$ and $\Phi_{model}$.

Other Cases: Using Multiple Reflective Plates to Model a Body

If the threat object is not located on a flat part of the body, the body can be modeled using a number of plates whose orientations are derived from the imaging data. The computation proceeds as normal except the computation of $\tau_{model}$ and $\Phi_{model}$ takes account of the plates and their orientations.

The body has a very high reflection index and therefore reflective plates are effective models.

Example

A 1 m×1 m reflect array panel consisting of 15000 patches generates a Gaussian shaped beam. The beam is used to image a block of wax ($\in$=2.59) 1.8 cm thick which is taped to a reflective surface (representing a human body). The wax is located 70 cm in front of the imaging panel. The imaging spot step increment is 0.4 cm horizontally, 0.4 cm vertically and 1.25 cm ahead.

A simple processing of the results indicates the location of the wax and gives a close indication of its width and length. It also states that the wax thickness is between Tmin=1.2 cm and Tmax=2.4 cm.

Two volume elements are chosen as test points, one is located inside the threat and the other is located on the body but outside the threat. Thickness and dielectric permittivity values are respectively being swept between $T_{min}$ and $T_{max}$ (step of 0.2 cm), $\in_{min}$ and $\in_{max}$ ($\in_{min}$=1 and $\in_{max}$=4 step=0.5). Method 3 was used to compute $\tau_{model}$ and $\Phi_{model}$ for the chosen test points. Computation results are then compared to measurement results in order to find wax dielectric permittivity and thickness. The best match for the two test points was achieved with a thickness of 1.6 cm and a dielectric permittivity of 2.5.

Ideally, two test points should lead to the right solution but, it is advisable to use multiple test points to find/confirm the appropriate dielectric permittivity and thickness.

The invention provides the major advantage of utilising existing imaging system hardware to generate not only an image of the scan volume, but also an estimate of the permittivity of concealed objects. When coupled with an appropriate data-base the system can suggest material identity based on the permittivity estimates.

The invention is not limited to the embodiments described but may be varied in construction and detail.

The invention claimed is:

1. An imaging system comprising
a transmitter for directing radiation at a scan volume in which there is a target;
a receiver for receiving scattered radiation from the volume; and
a reflect array for focusing incident beam radiation;
a processor for processing the scattered radiation to generate an image according to amplitude and phase of the received radiation;
a display coupled to the processor, for generating an image display;
wherein the transmitter is adapted to transmit the incident radiation with a substantially single frequency;
wherein the system is adapted to identify a concealed material;
wherein the processor is adapted to classify a concealed dielectric material according to permittivity relative to that of the human body, said relative permittivity being deduced from amplitude and phase information in the received radiation;
wherein the processor is adapted to measure phase and amplitude of scattered radiation both near the concealed material and at the concealed material, that near the concealed material providing a reference; and
wherein the system is adapted to detect radiation from two or more volume elements, a volume element providing reference data if it does not include the concealed material;
wherein the transmitter and the receiver comprise a horn in a confocal arrangement, in which the horn illuminates a reflect array and the reflect array is configured to focus the radiation at an element in the scan volume, and the reflections are in turn refocused by the reflect array at the horn aperture, and the processor is adapted to control the reflect array to scan the focal point throughout the scan volume in a systematic way, and to use horn pattern and the scan strategy to compute the geometry associated with each volume element in terms of individual rays, and in which amplitude and phase variations between the object and the surrounding volume and the computed geometry are used to estimate the relative permittivity; and
wherein for each transmitted ray data for two returned rays is processed by the processor, in which a first ray is reflected off the surface of the object and a second ray is transmitted through the object and reflected at an interface between the object and the body, and in which the processor is adapted to perform an estimation process which tracks both rays and identifies the following events:
neither ray is recovered by the horn and therefore plays no part in the estimation process, the first ray is recovered and is accounted for in the estimation process but the second ray is lost,
the second ray is recovered and is accounted for in the estimation process but the first ray is lost, and
both rays are recovered and both contribute to the estimation process.

2. The imaging system as claimed in claim 1, wherein said frequency is in the range of 1 GHz to 300 GHz.

3. The imaging system as claimed in claim 1, wherein said frequency is in the range of 1 GHz to 80 GHz.

4. The image processing system as claimed in claim 1, wherein the processor is adapted to automatically identify anomalies at edges in the recorded images, and to use said anomalies when deriving relative permittivity data.

5. The imaging system as claimed in claim 1, wherein the processor is adapted to classify materials based on a database of relative permittivities, and said database includes permittivity data or relative permittivity data for specified threat materials such as explosives or narcotics.

6. The imaging system as claimed in claim 1, wherein the processor is adapted to process amplitude and phase contrast from element to element in the scan volume to generate an image of the scan volume.

7. The imaging system as claimed in claim 1, wherein the processor is adapted to process amplitude and phase contrast from element to element in the scan volume to generate an image of the scan volume; and wherein different amplitude and phase responses for the elements are used by the processor to detect the location and the orientation of a concealed material.

8. The imaging system as claimed in claim 1, wherein the processor is adapted to execute algorithms implementing Snell's law coupled to the electromagnetic properties of fields in the vicinity of boundaries to compute amplitude as a level of attenuation, and phase, Tmodel and Φmodel, of received radiation.

9. The imaging system as claimed in claim 1, wherein the processor is adapted to execute algorithms reflecting the electromagnetic properties of wave impedance and reflection coefficient in the vicinity of boundaries to compute amplitude as a level of attenuation, and phase, Tmodel and Φmodel, of received radiation.

10. The imaging system as claimed in claim 1, wherein the processor is adapted to execute confocal image theory algorithms to compute amplitude as a level of attenuation and phase, model and Φmodel, of received radiation.

11. The imaging system as claimed in claim 1, further comprising a reflector for reflecting scattered radiation, and the receiver is mounted to receive radiation after being reflected.

12. The imaging system as claimed in claim 1, further comprising a reflector for reflecting scattered radiation, and the receiver is mounted to receive radiation after being reflected; and wherein the reflector comprises a reflect array configured to focus the transmitted radiation at successive elements in the scan volume.

13. The imaging system as claimed in claim 1, wherein the transmitter and the receiver comprise a horn antenna, and the system comprises a reflect array arranged in tiles, each tile consisting of an array of patch antennas with switching transistors and an associated controller for controlling the transistors, and in which the controller is adapted to configure phases of the patch antennas to achieve a particular pattern in space when the array is illuminated by the horn antenna, in which the processor is adapted to:
 calculate and sum distance from the horn antenna to a patch and distance from the patch to the focal point,
 convert said distance into wavelengths at the operating frequency, and
 convert a fractional portion of the distance into phase by multiplying by a number of degrees, and in which for each patch to constructively contribute to the focus the phases must be substantially identical.

14. The imaging system as claimed in claim 13, wherein a transistor is selected to add 0 or 180 degree phase shift depending on the calculated phase by turning it on and 0 degrees by turning it off, scanning being implemented over the volume by applying appropriate patterns of switching the transistors.

* * * * *